United States Patent [19]

Horton et al.

[11] 4,419,230

[45] Dec. 6, 1983

[54] APPARATUS FOR CONTAINING A LEAKAGE OF PCB COMPOUND

[75] Inventors: Tommy A. Horton; Michael D. Augustyn, both of Bremerton, Wash.

[73] Assignee: The United States of America as represented by the Secretary of the Navy, Washington, D.C.

[21] Appl. No.: 342,634

[22] Filed: Jan. 26, 1982

[51] Int. Cl.³ .............................................. B03D 3/00
[52] U.S. Cl. .................................... 210/114; 210/119
[58] Field of Search ................ 210/114, 119, 136, 115

[56] References Cited

U.S. PATENT DOCUMENTS

| | | | |
|---|---|---|---|
| 1,698,067 | 1/1929 | Pink | 210/114 |
| 1,995,742 | 3/1935 | Linnmann, Jr. | 210/114 |
| 2,170,247 | 8/1939 | Lambert | 210/114 |
| 2,533,395 | 12/1950 | Paine | 210/119 |
| 4,053,405 | 10/1977 | De Keyser | 210/119 |

Primary Examiner—John Adee

Attorney, Agent, or Firm—R. F. Beers; Charles D. B. Curry; William C. Daubenspeck

[57] ABSTRACT

Apparatus for confining a leakage of polychlorinated byphenyl (PCB) from an outdoor electrical substation while permitting rain water to be discharged into the outside environment when no PCB is present. The electrical equipment is disposed on a walled pad having sufficient containment volume to hold the maximum PCB leakage. The outlet from the containment volume is through a water/PCB separator float valve which is disposed vertically in a catch basin. The valve has a tubular body having a flow-through section with apertures which communicate with the catch basin and a converging section of circular cross-section above the flow-through section. A spherical float having a specific gravity between that of water and PCB is confined in the tubular body. The float, while sinking to the bottom of the valve in water, will rise on PCB such that as the level of PCB increases in the catch basin, buoyant forces will cause the float to be seated in the converging section to close the valve and confine the PCB to the containment volume.

10 Claims, 4 Drawing Figures

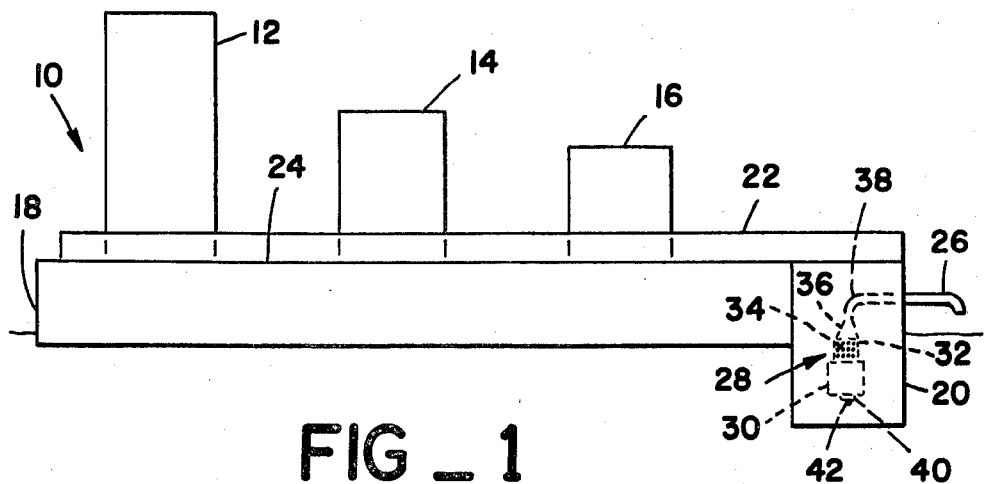
FIG_1
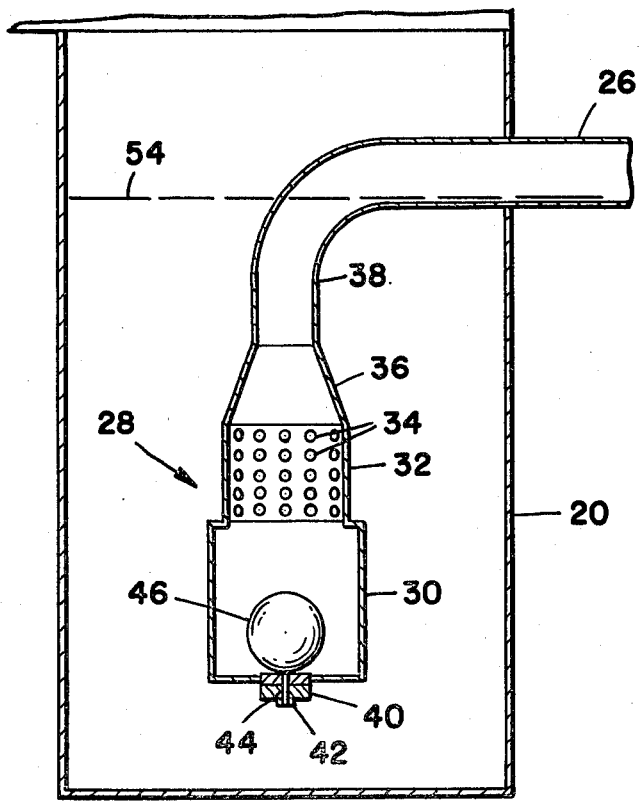
FIG_2A

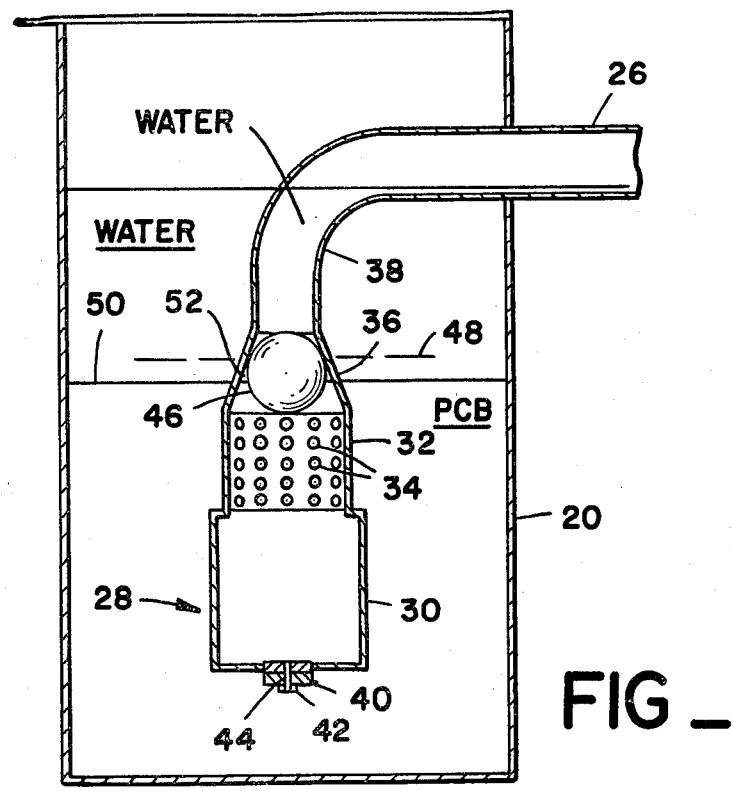
FIG _ 2B
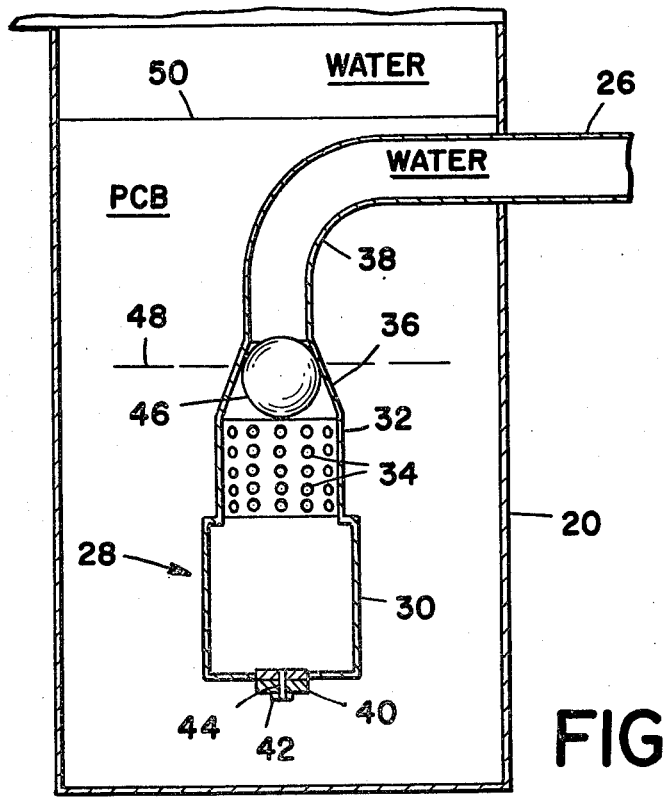
FIG _ 2C

APPARATUS FOR CONTAINING A LEAKAGE OF PCB COMPOUND

BACKGROUND OF THE INVENTION

1. Field of the Invention

This invention is related to apparatus for containing a leakage of polychlorinated biphenyl (PCB) compound and, in particular, to apparatus for containing a leakage of PCB compound from outdoor equipment while permitting rain water to be discharged into the outside environment. The invention relates especially to a float valve which allows water to flow while preventing the passage of PCB compounds.

2. Description of Prior Art

Most present day electrical transformers contain PCB compounds to facilitate the removal of heat generated in the transformers. Because the PCB is extremely hazardous to humans and does not break down in the environment, it is necessary to contain PCB spills so that the chemical does not reach the environment. When spills occur the cleanup is extremely expensive because all contaminated material must be collected and removed to a hazardous waste disposal site.

In the past, Imbiber valves were placed in the drain lines of electrical substation pads to contain any PCB which leaked from transformers or other electrical equipment. The Imbiber beads in the valves absorb the PCB (or other petroleum products) and expand to effectively block passage through the valve. However, water is able to pass through the Imbiber valve only at low flow rates even when no PCB is present and thus the valves severely restrict the passage of water from the electrical substation pads. During large rain storms, the restricted flow through the valves may cause water to back up into the electrical units resulting in damage to electrical switching equipment.

SUMMARY OF THE INVENTION

It is therefore a primary object of the present invention to contain leakage of PCB compounds from electrical substations and also permit storm water to flow unrestricted from the electrical substation pads.

It is a further object of the present invention to provide this primary object through the use of apparatus which is of simple construction, inexpensive to produce, reliable, and requires little maintenance.

These and other objects are provided by a substation pad arrangement in which liquids striking the pad such as rain water or PCB leakages are directed into a catch basin and must pass through a PCB and water separator valve in order to be discharged into the external environment. The valve has a vertically disposed body of circutor cross-section which contains a spherical float having a specific gravity between that of water and PCB so that it will sink in water and float on PCB. As the level of liquid in the catch basin rises, it will flow into the lower portion of valve body and the float will either rest on the bottom of the valve body or float on the liquid depending on the relative specific gravities. In the case of rain water, the level of liquid will rise in the catch basin and the valve until it reaches the level of the discharge line where upon the water will flow into the external environment. In the case of PCB the spherical float will float on the surface of the PCB as it rises. The rising PCB will cause the spherical float to seat in a converging section of the valve body to prevent the PCB from entering the discharge line.

BRIEF DESCRIPTION OF THE DRAWINGS

FIG. 1 is a schematic plan view illustrating an electrical substation incorporating the present invention.

FIGS. 2a–2c are a cross-sectional view of a PCB and water separator float valve in a catch basin illustrating the operation of the valve.

DESCRIPTION OF THE PREFERRED EMBODIMENT

Referring now to FIG. 1, there is shown an electrical substation 10 having three transformers 12, 14, and 16 mounted on a concrete substation pad 18. A standard catch basin 20 is constructed in one corner of the pad 18. A containment wall 22 is disposed on the perimeter of the pad 18 and the surface 24 of the pad is sloped toward the catch basin 20 so that liquids on the surface of the pad will be confined thereon and will flow into the catch basin. The catch basin 20 has a discharge line 26 through which the liquids which drain into the basin are discharged into the external environment. The transformers 12, 14, and 16 typically contain large volumes of PCB compound which, in the event of leakage, must be prevented from reaching the outside environment. Accordingly the volume bounded by the containment wall 22 is at least 100% to 125% of the volume of PCB in the transformer containing the largest amount of PCB.

A PCB and water separator valve 28 is disposed vertically in the catch basin 20 and has its output communicating with the discharge line 26. As best shown in the cross-sectional views of FIGS. 2a–2c, the preferred embodiment of the separator valve 28 has a valve body which is circular in cross-section and includes a lower cleanout section 30, a flow-through section 32 having apertures 34, a reducer section 36, and a discharge section 38. A plug 40 is threadably secured to the lower section 30 to enclose the bottom of the valve body. The plug 40 is provided with a head 42 to facilitate the attachment or removal of the plug to or from the valve body and has a drain hole 44 which communicates between the interior of the valve body and the catch basin.

A specially-weighted spherical float 46 is disposed in the interior of the valve body. The spherical float 46 has a specific gravity of approximately midway between the specific gravity of PCB (specific gravity 1.35±0.03) and that of water (specific gravity 1.00). A float 46 having a specific gravity of between approximately 1.14 and approximately 1.22 is suitable; however, a float having a specific gravity of approximately 1.18 is preferred. The spherical float 46 floats on PCB but sinks in water.

The diameter of the float 46 is somewhat larger (preferably at least one inch larger) than the diameter of the discharge section 38 and somewhat less than the diameter of the lower section 30 and the flow-through section 32. These dimensions allow the spherical float 46 to freely rise on PCB and pass through the lower section 30 and the flow-through section 32 and to seat against the wall of the reducer section 36. The relative diameters of the reducer section 36, the discharge section 38 and the spherical float 46 are chosen so that the level of the seal as indicated by dashed line 48 in FIG. 2b is above the level of the PCB at seating as indicated by line 50. This provides an up-pressure on the float 46 as the level of the PCB increases beyond the level of line 50 to ensure a strong seal between the float and the wall of the reducer section 36. In addition a water barrier may also be trapped in the annular space 52 between PCB and the level of the seal.

The float 46 is preferably made from a material which will not breakdown with age or upon exposure to water or sunlight. Silicon rubber having the foregoing capability is a preferred material. It is also preferred that a float 46 of rubber have a hardness factor of between 45 and 60 to provide a smooth surface and also a limited flexibility for creating a better quality seal. The valve body may be of any material which provides a smooth internal surface for the float seat and also will not breakdown with age or exposure to water or sunlight. Thermoplastics such as ABS, PVC, polypropylene and others are suitable for use as the valve body.

In normal operation, that is, when there is no PCB leakage, rain water falling on the substation 10 flows over the sloping surface of the pad 18 to the catch basin 20. Since the spherical float 46 is heavier than the water, the float 46 remains on the bottom of the valve body as the water rises in the catch basin 20. The rising water flows into valve body through the apertures 34 in the flow-through section 32, passes unrestricted through the reducer section 36 and the discharge section 38, and flows through the discharge line 26 into the external environment. The level of water in the catch basin 20 is thereby limited to the level of the discharge line 26 as illustrated by dashed line 54 in FIG. 2a.

In the event of a leakage of PCB from one of the transformers 12, 14, or 16, the PCB liquid is similarly directed into the catch basin 20. Since the PCB is heavier than and immiscible in water, the PCB will sink to the bottom of any water in the catch basin 20, displacing the water upwards. As the level of the PCB in the catch basin increases, the PCB will first enter the bottom of the valve body through the aperture 44 in plug 40 and then through the apertures 34 if the PCB level rises to height of the flow-through section 32. Since the spherical float 46 is lighter than the PCB, the float will rise on the surface of the PCB as it rises upward in the valve body. As the level of PCB in the catch basin increases above the flow through section 32, the float 46 will rise up into the reducer section 36, and seat in the reducer section as shown in FIG. 2b with lines 48 and 50 indicating the seal level and PCB level respectively. The valve 28 is thereby sealed so that no PCB may pass through the discharge line 26. A further increase in the PCB level as illustrated in FIG. 2c will create an additional up-pressure on the float 46 to provide a stronger seal. Thus the valve is closed before any of the PCB enters the discharge line 26 so that all of the PCB leakage may be confined within the containment wall 22 and the catch basin 20. Since the leakage does not reach the external environment, the cleanup procedures are much simpler and the cost of cleanup is greatly reduced.

The removable plug 40 allows the removal of debris which may accumulate in the lower portion 30 of the valve body as a result of normal runoff.

It can be seen that, depending on the amount of rainfall, the valve body below the discharge line 28 may be standing in water and that the valve above the water line will be exposed to the weather and sunlight. Thus the materials used in the construction of the valve must not breakdown due to exposure to water, the weather or sunlight.

Obviously many modifications and variations of the present invention are possible in the light of the above teachings. It is therefore to be understood that within the scope of the appended claims the invention may be practiced otherwise than as specifically described.

What is claimed is:

1. Apparatus for confining a leakage of PCB from equipement to an enclosed volume and allowing water to be discharged when no PCB is present, which comprises:
   (a) a containment receptacle having sufficient volume to hold the maximum PCB leakage, said equipment being disposed within said containment receptacle;
   (b) a catch basin disposed lower than said receptacle and communicating with said receptacle for receiving liquid run-off from said receptacle, said catch basin having a discharge outlet; and
   (c) a water/PCB separator float valve disposed in said catch basin, said valve comprising:
      (1) a vertical, tubular valve body, said body having a flow-through section having apertures which communicate with the interior of the catch basin and a converging section of circular cross-section above said flow-through section, the smaller end of said converging section being coupled to the discharge outlet of said catch basin so that any material discharged from said catch basin through said discharge outlet must pass through the converging section of said valve body;
      (2) a spherical float confined in said tubular valve body below said converging section, said spherical float having a specific gravity between that of PCB and water, said spherical float being adapted to seat in said converging section to seal said converging section, whereby said float will sink in water to allow water entering said valve body to flow through said converging section to said discharge outlet and whereby said float will rise on PCB such that as the level of PCB increases in the catch basin, buoyant forces on the float will cause the float to be seated in the converging section to prevent PCB from flowing through said converging section to said discharge outlet, thereby confining the PCB to the catch basin and the containment receptacle.

2. Apparatus as recited in claim 1 wherein said containment receptacle includes:
   (a) a pad upon which said PCB containing equipment is mounted; and
   (b) a containment wall enclosing said equipment and said pad for confining liquid on the surface of said pad.

3. A PCB and water separator float valve for use in a catch basin having a discharge outlet, which comprises:
   (a) a vertical, tubular valve body, said body having a flow-through section having apertures which communicate with the interior of the catch basin and a converging section of circular cross-section above said flow-through section, the smaller end of said converging section being coupled to the discharge outlet of said catch basin so that any material discharged from said catch basin through said discharge outlet must pass through the converging section of said valve body;
   (b) a spherical float confined in said tubular valve body below said converging section, said spherical float having a specific gravity between that of PCB and water, said spherical float being adapted to seat in said converging section to seal said converging section, whereby said float will sink in water to allow water entering said valve body to flow through said converging section to said discharge outlet and whereby said float will rise on PCB such that as the level of PCB increases to the catch basin, buoyant forces on the float will cause the float to be seated in the converging section to prevent PCB from flowing through said converging section to said discharge outlet, thereby confining the PCB to the catch basin and the containment receptacle.

4. Apparatus as recited in claim 1 or 3 wherein said valve body includes a cleanout section below said flow-through section, said cleanout section having a removable plug which encloses the bottom of the valve body, said plug having a drain hole which communicates between the interior of the valve body and the catch basin.

5. Apparatus as recited in claim 1 or 3 wherein said spherical float has a specific gravity of approximately midway between that of PCB and that of water.

6. Apparatus as recited in claim 5 wherein said valve body and said spherical float are made from materials which will not breakdown with age or upon exposure to sunlight or water.

7. Apparatus as recited in claim 6 wherein said valve body is made of a thermoplastic material.

8. Apparatus as recited in claim 5 wherein said spherical float is made of silicon rubber having a hardness factor of between 45 and 60.

9. Apparatus as recited in claim 5 wherein the relative diameters of the spherical float and the converging section are chosen so that the level of the seal is above the level of the PCB at sealing so that an up pressure is provided on the float as the level of the PCB increases beyond the level at sealing.

10. Apparatus as recited in claim 1 wherein the relative diameters of the spherical float and the converging section are chosen so that the level of the seal is above the level of the PCB at sealing so that an up pressure is provided on the float as the level of the PCB increases beyond the level at sealing.

* * * * *